(12) United States Patent
Tachibana et al.

(10) Patent No.: US 11,494,659 B2
(45) Date of Patent: Nov. 8, 2022

(54) INFORMATION PROCESSING METHOD AND INFORMATION PROCESSING APPARATUS

(71) Applicant: Kioxia Corporation, Minato-ku (JP)

(72) Inventors: Fumihiko Tachibana, Yokohama (JP); Daisuke Miyashita, Kawasaki (JP)

(73) Assignee: Kioxia Corporation, Minato-ku (JP)

( * ) Notice: Subject to any disclaimer, the term of this patent is extended or adjusted under 35 U.S.C. 154(b) by 425 days.

(21) Appl. No.: 16/818,228

(22) Filed: Mar. 13, 2020

(65) Prior Publication Data

US 2020/0410360 A1 Dec. 31, 2020

(30) Foreign Application Priority Data

Jun. 26, 2019 (JP) .............................. JP2019-118451

(51) Int. Cl.
*G06N 3/08* (2006.01)

(52) U.S. Cl.
CPC .................................. *G06N 3/084* (2013.01)

(58) Field of Classification Search
None
See application file for complete search history.

(56) References Cited

U.S. PATENT DOCUMENTS

| 2017/0061330 A1 | 3/2017 | Kurata |
| 2018/0268297 A1 | 9/2018 | Okazaki et al. |
| 2019/0026630 A1 | 1/2019 | Ide et al. |
| 2019/0102673 A1* | 4/2019 | Leibovich ........... G06F 16/9017 |
| 2019/0294413 A1* | 9/2019 | Vantrease .............. G06N 3/063 |
| 2020/0097818 A1* | 3/2020 | Li .......................... G06N 3/084 |

(Continued)

FOREIGN PATENT DOCUMENTS

| JP | 2017-49684 A | 3/2017 |
| JP | 2017-59071 A | 3/2017 |
| JP | 2017-158183 A | 9/2017 |

(Continued)

OTHER PUBLICATIONS

Park et al.,"Value-aware Quantization for Training and Inference of Neural Networks", arXive:1804.07802, https://arxiv.org/abs/1804.07802, 2018,16 pages.

(Continued)

*Primary Examiner* — Mohammad K Islam
(74) *Attorney, Agent, or Firm* — Oblon, McClelland, Maier & Neustadt, L.L.P.

(57) ABSTRACT

According to one embodiment, an information processing method includes performing, in an intermediate layer of a deep neural network, a forward propagation using a first parameter and based on a first input value represented by a first bit number; performing quantization to produce a second input value represented by a second bit number smaller than the first bit number, and storing the produced second input value in the memory; calculating a second parameter based on a result of an operation using the second input value stored in the memory and a value obtained by the forward propagation, the second parameter being an update of the first parameter and for use in the learning process; and determining a condition for the quantization based on a gradient difference obtained in said calculating the second parameter.

16 Claims, 9 Drawing Sheets

(56) References Cited

U.S. PATENT DOCUMENTS

2020/0293895 A1* 9/2020 Tachibana ............ G06N 3/0454

FOREIGN PATENT DOCUMENTS

| JP | 2018-55259 A | 4/2018 |
|----|--------------|--------|
| JP | 2018-156451 A | 10/2018 |
| WO | WO 2017/168865 A1 | 10/2017 |

OTHER PUBLICATIONS

Chakrabarti et al.,"Backprop with Approximate Activations for memory-efficient Network training", arXiv:1901.07988, https://arxiv.org/1901.07988, 2019, 9 pages.

Banner et al.,"Post training 4-bit quantization of convolutional networks for rapid-deployment", arXiv:1810.05723, https://arxiv.org/abs/1810.05723, 2018, 16 pages.

* cited by examiner

INFORMATION PROCESSING METHOD AND INFORMATION PROCESSING APPARATUS

CROSS-REFERENCE TO RELATED APPLICATIONS

This application is based upon and claims the benefit of priority from Japanese Patent Application No. 2019-118451, filed Jun. 26, 2019, the entire contents of which are incorporated herein by reference.

FIELD

Embodiments described herein relate generally to an information processing method and an information processing apparatus to be applied to a learning process of a convolutional neural network (CNN).

BACKGROUND

A CNN is an effective means for, e.g., image recognition, and may be a deep neural network (DNN) employing back propagation in its learning process.

A CNN includes an input layer, an intermediate layer, and an output layer. The CNN obtains by calculating an output value in the output layer after a series of processing in the intermediate layer with input values and parameters (weights). The intermediate layer is constituted by multiple layers including a convolution layer, where an input value to the multiple layers (i.e., an output value from the preceding layer) is called an "activation".

During the back propagation in the learning process of a CNN, activations are stored in a memory. To save the memory capacity, these activations may often be subjected to quantization so that the number of their bits is reduced. The quantization here is not a processing relating to so-called analog-to-digital value conversion, but a processing of reducing the number of bits of the original value that represents the respective activation.

Quantizing activations allows for the saving of a memory capacity, while such quantization as simply reducing the number of bits of activations may degrade an accuracy in a learning of the CNN. In order to secure the learning accuracy, therefore, realization of optimum activation quantizing technique is expected.

DETAILED DESCRIPTION

In general, according to one embodiment, an information processing method is provided for application to a learning process of a deep neural network that includes a convolution layer. The method uses a processor, and a memory for an operation by the processor. The learning process includes forward propagation and back propagation. The method includes: performing, in an intermediate layer of the deep neural network, the forward propagation using a first parameter and based on a first input value represented by a first bit number; performing quantization to produce a second input value represented by a second bit number smaller than the first bit number, and storing the produced second input value in the memory; calculating a second parameter based on a result of an operation using the second input value stored in the memory and a value obtained by the forward propagation, the second parameter being an update of the first parameter and for use in the learning process; and determining a condition for the quantization based on a gradient difference identified in said calculating the second parameter.

Now, the embodiments will be described with reference to the drawings. The description will use same reference symbols for the structural features or components having the same or substantially the same functions and configurations. Also, each embodiment will be set forth as an example of devices or methods for implementing the underlying technical ideas, and materials, shapes, structures, arrangements, or the like of the components, etc. are not limited to what will be described here.

Each functional block may be realized in the form of hardware, computer software, or a combination thereof. It is not a requisite to organize functional blocks in such a manner as will be described for exemplary functional blocks. For example, a function may be partly implemented by a functional block different from the exemplary functional blocks. Further, the exemplary functional blocks may each be divided into more specific functional blocks.

First Embodiment

Figure 1:
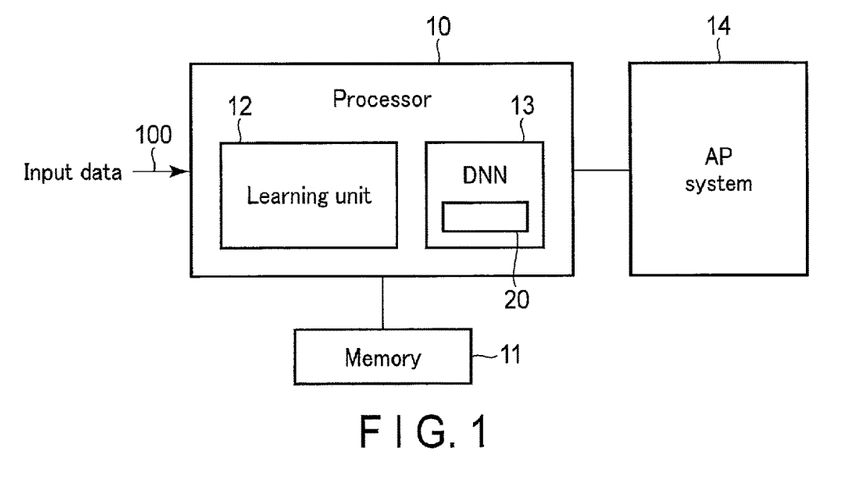
FIG. 1 is a block diagram showing a configuration of an information processing apparatus according to a first embodiment.

FIG. 1 is a block diagram showing a configuration of an information processing apparatus according to the first embodiment. As shown in FIG. 1, the information processing apparatus according to the first embodiment includes a processor 10, a memory 11, and an application (AP) system 14.

In the first embodiment, the processor 10 may be, for example, a graphic processing unit (GPU) or a central processing unit (CPU) constituted by hardware and software. The processor 10 uses a learning unit 12 to conduct, in cooperation with the memory 11, a learning process of a deep neural network (DNN) 13. The learning unit 12 according to the first embodiment performs quantization as will be discussed later.

For the DNN 13, the first embodiment adopts a convolutional neural network (CNN) 20 which is effective in, for example, image recognition. More specifically, the processor 10 conducts a learning process for parameters in the CNN 20 for image recognition, with the use of input data 100 containing, for example, an image dataset corresponding to 60,000 images as the data for learning. The input data 100 also contains a ground truth label (training data) for comparison with outputs of the CNN 20.

The AP system 14 here may be, for example, an image recognition system adapted to recognize unknown contents of an input image using the CNN 20 optimized by the processor 10. Such image recognition system includes a computer or a server system, constituted by hardware and software, a cloud system providing Web services, etc.

Figure 2:
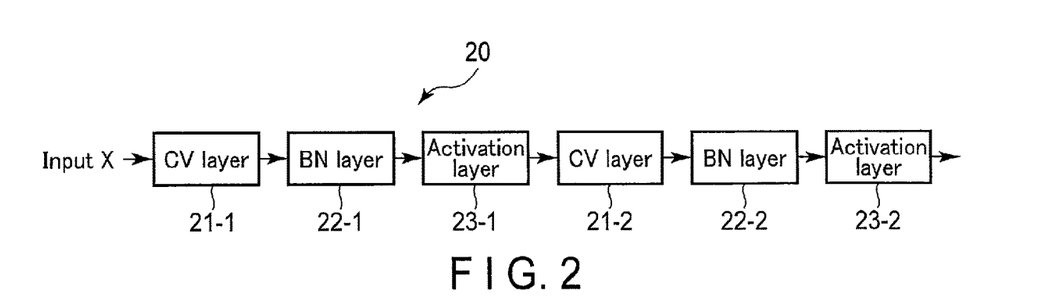
FIG. 2 is a diagram showing one exemplary CNN in the first embodiment.

FIG. 2 is a block diagram showing one example of the CNN 20 in the first embodiment. The CNN 20 includes an intermediate layer as shown in FIG. 2, between an input layer (not illustrated) and an output layer (not illustrated). The intermediate layer may also be called a "hidden layer".

The intermediate layer has multi-stage layered architecture including a first-stage layer including a convolution layer (CV layer) 21-1, a batch-normalization layer (BN layer) 22-1, and an activation layer 23-1, a second-stage layer including a CV layer 21-2, a BN layer 22-2, and an activation layer 23-2, and so on.

According to the first embodiment, the learning unit 12 causes the CNN 20 to undergo a learning process (mini-batch learning) using input data (input X) of a mini-batch size obtained by dividing the input data 100.

Within the CNN 20, the CV layer 21-1 (21-2) convolves the input X. Normalization and affine transformation are subsequently performed in the BN layer 22-1 (22-2). That is, the BN layer 22-1 (22-2) applies the normalization so that the feature distribution given by the CV layer 21-1 (21-2) is adjusted and unbiased, and applies the affine transformation for scaling and shifting. The activation layer 23-1 (23-2) applies, for example, activation processing (numerical conversion) using an activation Function which May be a Rectified Linear Unit (ReLU).

<Operations in First Embodiment>

Figure 3:
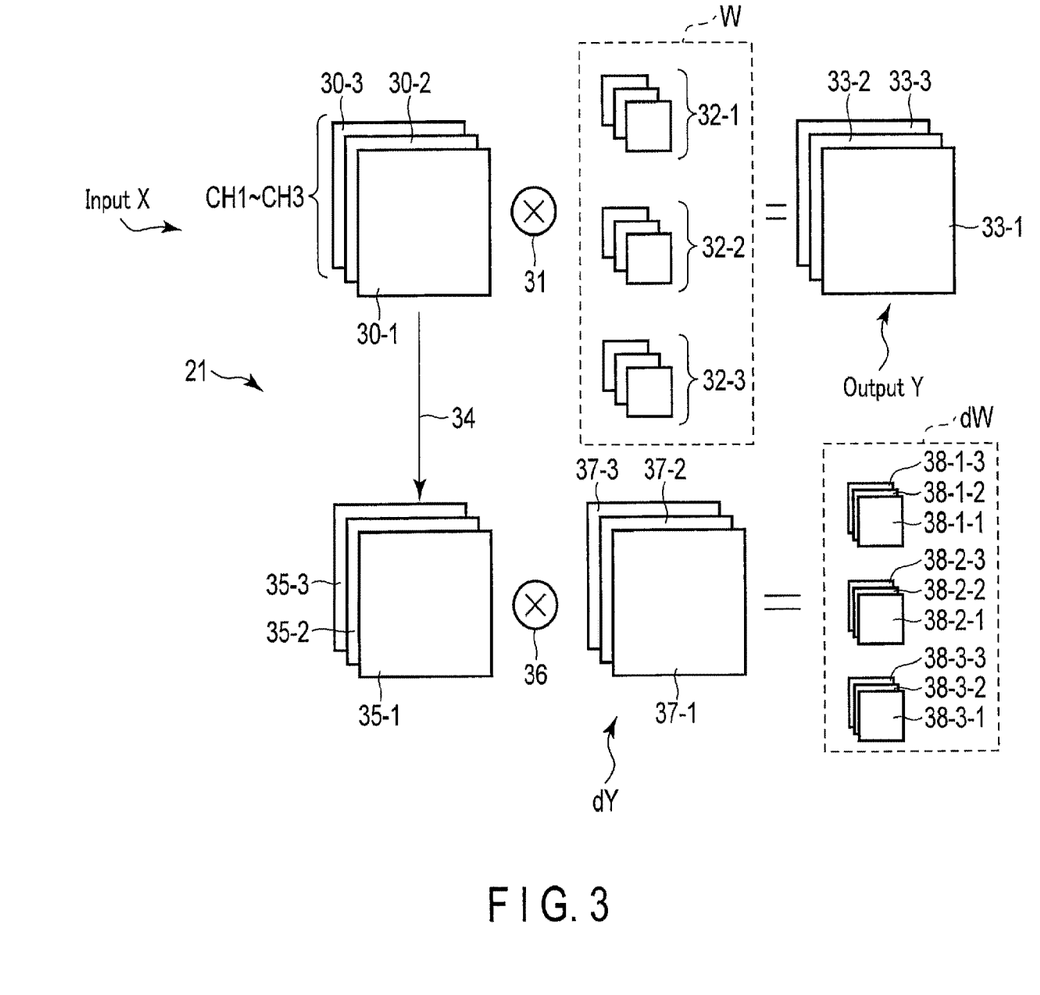
FIG. 3 is a diagram for explaining an overview of a learning process and quantization in the first embodiment.

Operations of the first embodiment will be described with reference to FIG. 3. FIG. 3 is a diagram for explaining an overview of the convolution in the learning process of the CNN 20, as well as an overview of the quantization, in the first embodiment. Note that, for the sake of explanation, the learning process conducted by the learning unit 12 will be described as the behavior or operations of the CNN 20.

In the CNN 20 as shown in FIG. 3, the CV layer 21-1 performs convolution (31) of the input X using multiple weight filters 32-1 to 32-3. If the input X here contains activations 30-1 to 30-3 of three channels CH-1 to CH-3 as in the case of, for example, color images, the weight filter 32-1 (32-2, 32-3) also has three channels. More concretely, the channels CH-1 to CH-3 may be associated with, for example, red, green, and blue components of a color image, respectively.

As such, the CNN 20 performs the convolution (31) with a parameter (weight W) according to the weight filter 32 (representative of the filters 32-1 to 32-3). The CNN 20 propagates the convolution result up to the output layer (not illustrated) via each of the intermediate layers including the BN layer 22-1, the activation layer 23-1, and so on (i.e., forward propagation). The output layer calculates an error (or a difference) (dY) between output Y that contains feature amounts 33-1 to 33-3 extracted by the convolution (31), and the ground truth label.

For the error (dY) between the output Y and the ground truth label, the CNN 20 updates the parameter (W) by back propagation (BP processing) using a gradient (dW) corresponding to an update amount of the parameter (W). More specifically, the CNN 20 calculates the gradient (dW) by a convolutional operation (36) adapted for the dW calculation as will be discussed later, and updates the parameter (W) based on this gradient (dW). For example, supposing that a parameter after the update is "Wnew" and a parameter before the update is "Wold", the updated parameter Wnew can be given as: Wnew=Wold−(Lr*dW), where Lr is a learning rate.

In this relation, the input value (input X) to the layers including the CV layer 21-1 and constituting the intermediate layer of the CNN 20 is called an "activation" as mentioned above. As shown in FIG. 3, the activation in the first embodiment is subjected to quantization (34) for each channel CH (representative of the channels CH-1 to CH-3).

More specifically, the learning unit 12 performs the quantization (34) to quantize the activation represented by, for example, 32 bits into the activation represented by, for example, 3 bits for each channel CH, and stores this activation after the quantization in the memory 11 for use in the BP processing in the CNN 20. In the following description, such an activation subjected to the quantization (34) may be called a quantized activation. Note that, with the quantization (34) in the first embodiment, an activation may also be quantized to be represented by, for example, 2 bits, 4 bits, or 5 bits, other than by 3 bits.

Figure 4:
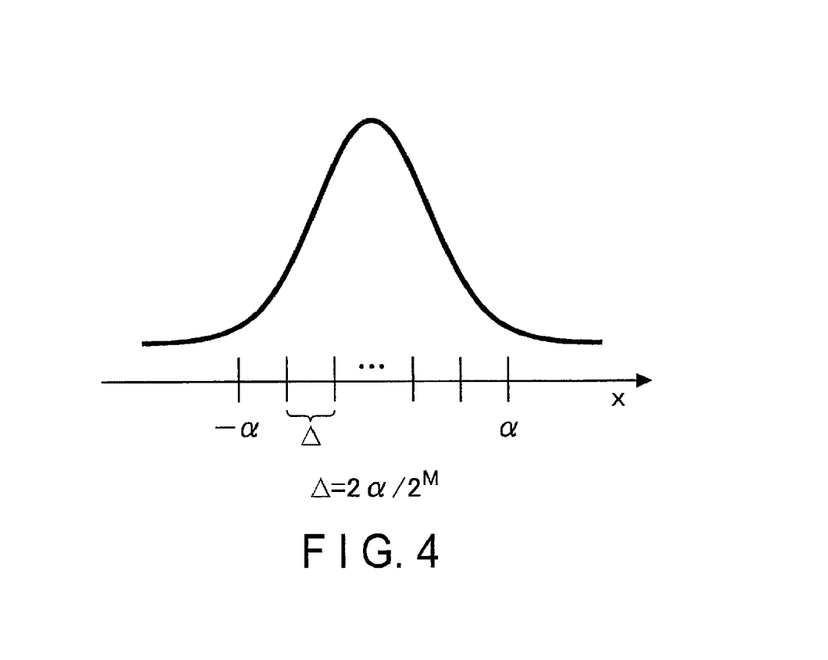
FIG. 4 is a diagram for explaining conditions for quantization in the first embodiment.

According to the first embodiment here, optimum values of the quantization width and the quantization range are determined as conditions for the quantization (34) of activations, so that proper learning accuracy can be secured. As shown in FIG. 4, activations represented by, for example, 32 bits are assumed to show a normal distribution or a Gaussian distribution. The quantization width $\Delta$ corresponds to a quantization step between adjacent quantized values, and is defined to be: $2\alpha/2^M$, where M is a value according to the quantization bit number and is an integer of 2 or greater. As to the quantization range $[-\alpha, +\alpha]$, $-\alpha$ and $+\alpha$ indicate the respective lower limit and upper limit for the quantization region delimited to $2^M$. An absolute value of the lower limit and the upper limit may be referred to as a clipping value $\alpha$.

Figure 5:
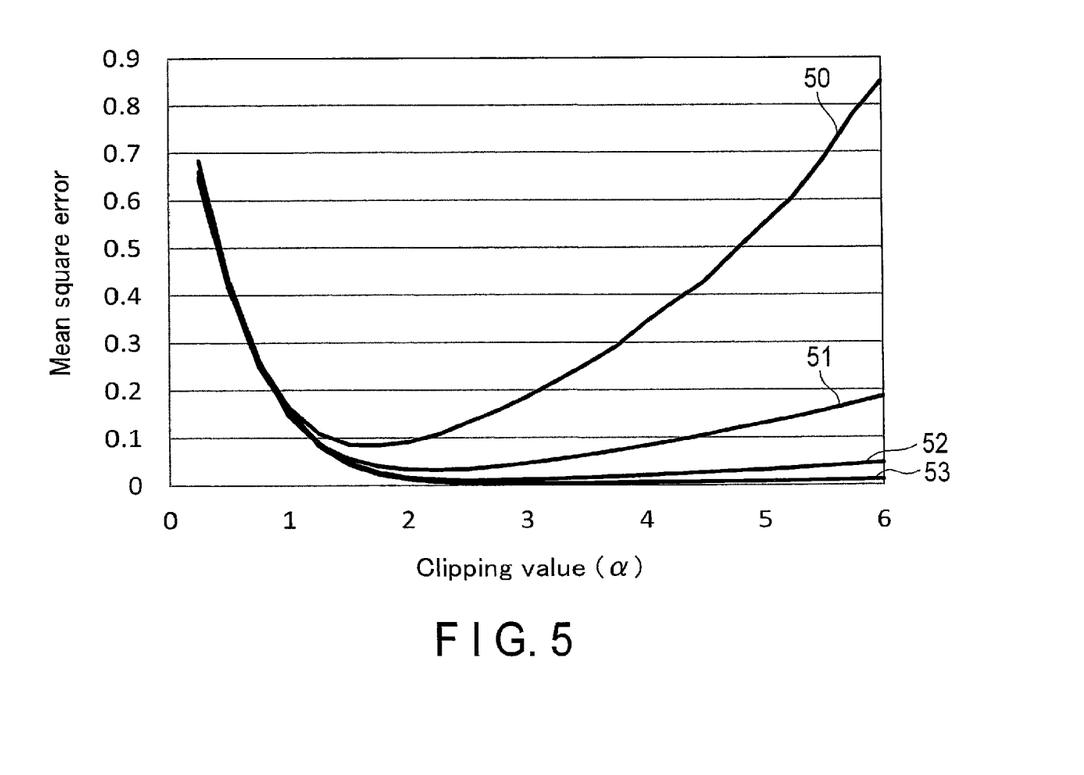
FIG. 5 is a diagram for explaining one example of processing of determining the quantization conditions.

FIG. 5 is a diagram for explaining one example of the processing of determining the quantization conditions. FIG. 5 shows mean square error functions 50 to 53 for the respective values of the quantization bit number M, as the functions of the clipping value $\alpha$ for the quantization range. The mean square error here is intended to be a mean square error between a non-quantized input, i.e., the input (X) before the quantization, and a quantized input (Q(X)) (not illustrated). The functions 50 to 53 are indicative of the mean square errors for the respective values of the quantization bit number M which are, for example, 2, 3, 4, and 5.

Figure 6:
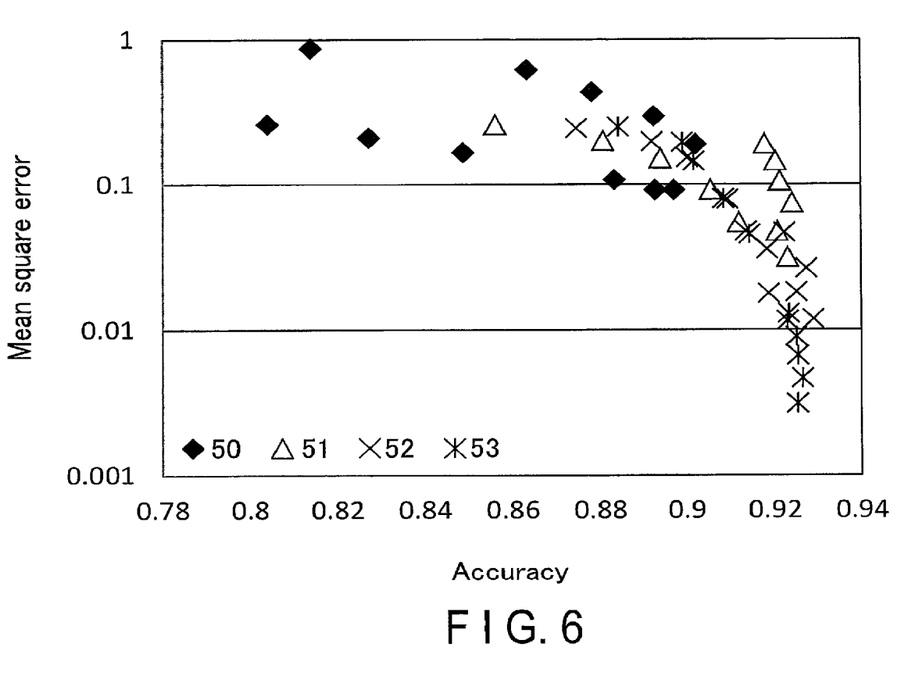
FIG. 6 is a diagram for explaining an effect of one example of the processing of determining the quantization conditions.

Fixing the values of the quantization bit number M here would yield a relationship where expanding the quantization range $[-\alpha, +\alpha]$ as the quantization condition will widen the quantization width $\Delta$. It is thus expected that selecting a point of the minimum mean square error would enable the setting of the quantization bit number M and the clipping value $\alpha$ that can secure the optimum learning accuracy. The optimum values of the quantization range and the quantization width can accordingly be specified. Nevertheless, it has been reported that, as shown in FIG. 6, actual learning processes may not show a correlation tendency in the learning accuracy among the functions 50 to 53 for the quantization bit number M at the same mean square error, and there are variations in the learning accuracy. The actual learning processes have used, for example, CIFAR10 (image dataset prepared as a learning sample for common use).

For the first embodiment, therefore, description will be given of a method and an apparatus for determining, as the conditions for the quantization (34) of activations, optimum values of the quantization width and the quantization range to provide a correlation tendency in the learning accuracy and to consequently allow the proper learning accuracy to be secured.

Figure 7:
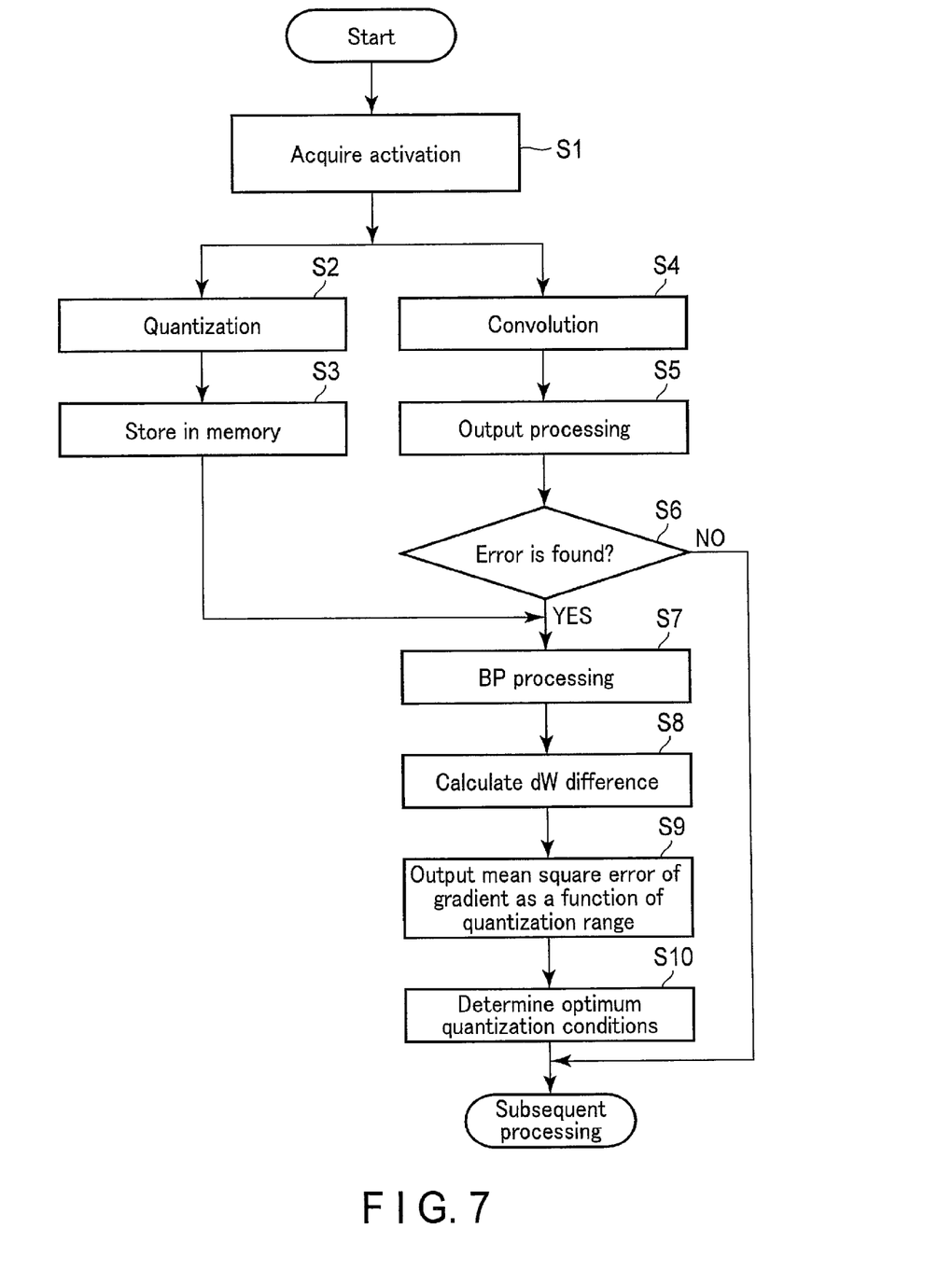
FIG. 7 is a flowchart for explaining a procedure of the learning process in the first embodiment.

FIG. 7 is a flowchart for explaining a procedure of determining the optimum values of the quantization width and the quantization range in the first embodiment. The processing steps will be explained using FIG. 7, with also reference to FIG. 3.

As shown in FIG. 7, the CNN 20 acquires (or receives an input of) the activation 30 (representative of the activations 30-1 to 30-3) for each channel CH as the input X (step S1), and then performs the forward propagation (forward processing) and the back propagation (BP processing or backward processing) as discussed above. Specifically, in the forward processing, the CV layer 21 convolves the activation 30 using the parameter (W) according to the filter 32 (representative of the filters 32-1 to 32-3) as shown in FIG. 3 (step S4).

Note that, according to the first embodiment here, the learning unit 12 quantizes the activation 30 represented by, for example, 32 bits (step S2), in parallel with the forward processing so that the quantized activation will be used for the BP processing in the CNN 20. After the quantization, the learning unit 12 stores the quantized activation in the memory 11 (step S3). As such, the activation 30 represented by, for example, 32 bits is stored in the memory 11 in the form of a quantized activation. In a normal operation, the activation 30 is quantized to be represented with a bit-number accuracy differing for the respective channel CH. As shown in FIG. 3, the activation 30 is subjected to the quantization (34) to be a quantized activation 35 (representative of quantized activations 35-1 to 35-3) represented by, for example, 3 bits.

Turning to FIG. 7, the CNN 20 propagates, as the forward processing, the result of the convolution (step S4) to the output layer via each of the layers including the BN layer 22 and the activation layer 23. The output layer performs its output processing including calculating an error (dY) between the output Y containing the feature amount extracted by the convolution, and the ground truth label (step S5). If the error (dY) is found between the output Y and the ground truth label (YES in step S6), the CNN 20 performs the BP processing to update the parameter (W) by propagating backward the error (dY) to the intermediate layer (step S7). According to the first embodiment, the learning unit 12 conducts the BP processing using the quantized activation 35 stored in the memory 11. Referring back to FIG. 3, the CNN 20 calculates, at the BP processing, the gradient (dW) for use in the update of the parameter (W). More specifically, and for example, the CNN 20 calculates a gradient (dW) 38-1-1 by performing convolution (36) using the quantized activation 35-1 of, e.g., 3 bits, and an error (dY) 37-1. Note that the errors (dY) 37-1 to 37-3 here have been calculated based on the activation 30 represented by, for example, 32 bits. The CNN 20 further calculates a gradient (dW) 38-2-1 using the quantized activation 35-1 and the error (dY) 37-2, and a gradient (dW) 38-3-1 using the quantized activation 35-1 and the error (dY) 37-3. In the similar manner, gradients (dW) 38-{1 to 3}-2 are calculated using the quantized activation 35-2 and the respective one of errors (dY) 37-{1 to 3}. Also, gradients (dW) 38-{1 to 3}-3 are likewise calculated using the quantized activation 35-3 and the respective one of errors (dY) 37-{1 to 3}.

Turning again to FIG. 7, the learning unit 12 according to the first embodiment calculates a mean square error (step S8), which is a difference between the gradient (dW) calculated using the input (X) before the quantization and the gradient (dWQ) calculated using the input (Q(X)) after the quantization. The learning unit 12 outputs the calculated mean square error as a function of the clipping value α for the quantization range (step S9). Based on this mean square error as a gradient difference, the learning unit 12 determines the optimum values of the quantization width and the quantization range, as the optimum quantization conditions (step S10).

Figure 8:
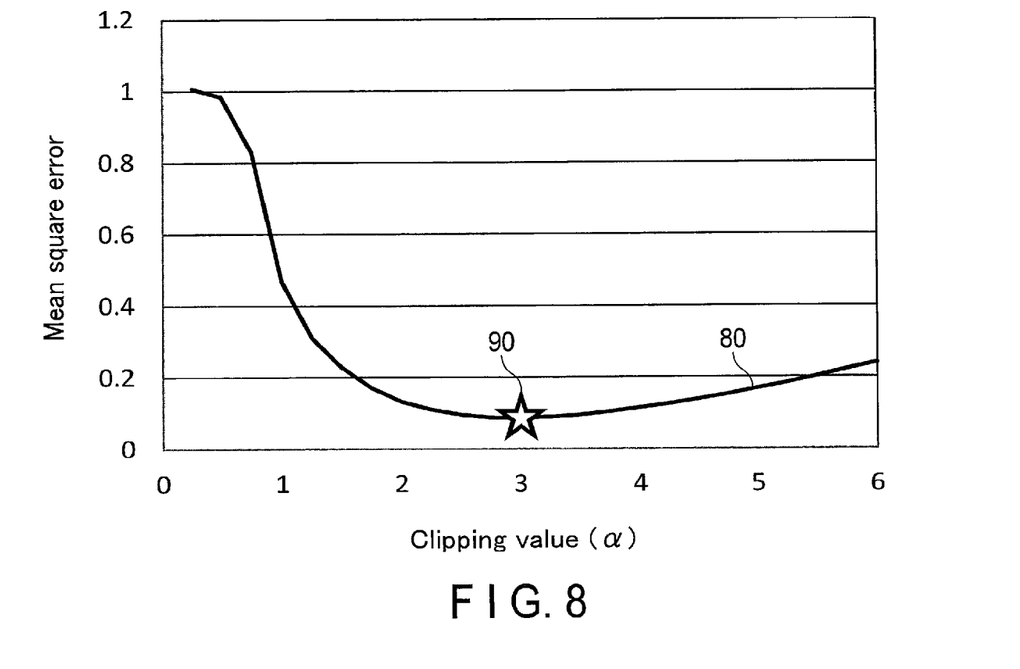
FIG. 8 is a diagram for explaining processing of determining a quantization conditions in the first embodiment.

As discussed above, what FIG. 5 shows are mean square errors each indicative of the difference between the non-quantized input (X) and the quantized input (Q(X)) as a function of the clipping value α for the quantization range. Now, FIG. 8 shows an output result 80 plotting a mean square error as the gradient difference identified for the case of setting the quantization bit number M to 3 bits, as a function of the clipping value α for the quantization range. The learning unit 12 calculates, at the BP processing, the gradient (dW) using the back-propagated error (dY), and the post-quantization gradient (dWQ) using the quantized input (Q(X)) and dY. It is understood from FIG. 8 that there is a difference between the gradient dW and the gradient dWQ. The learning unit 12 determines the minimum mean square error point 90 to be the optimum clipping value α, based on the output result 80. That is, the learning unit 12 can determine the optimum values of the quantization width Δ and the quantization range (i.e., −α and +α), as the optimum quantization conditions. The learning unit 12 continues to conduct the learning process while retaining the determined quantization conditions.

Note that the CNN 20 may iterate the learning process by repeating the convolution using the updated parameter (e.g., Wnew) obtained with the gradient (dW) until the error (dY) falls below a predetermined value, or may iterate the learning process as many as the number of times prescribed for the learning process (predetermined epoch number). The learning unit 12 according to the first embodiment may be adapted to, for example, output afresh the plotted mean square error at predetermined timings in the schedule of iterating the learning process for a predetermined epoch number, so that the setting of the optimum clipping value α is updated.

<Modification>

Figure 9:
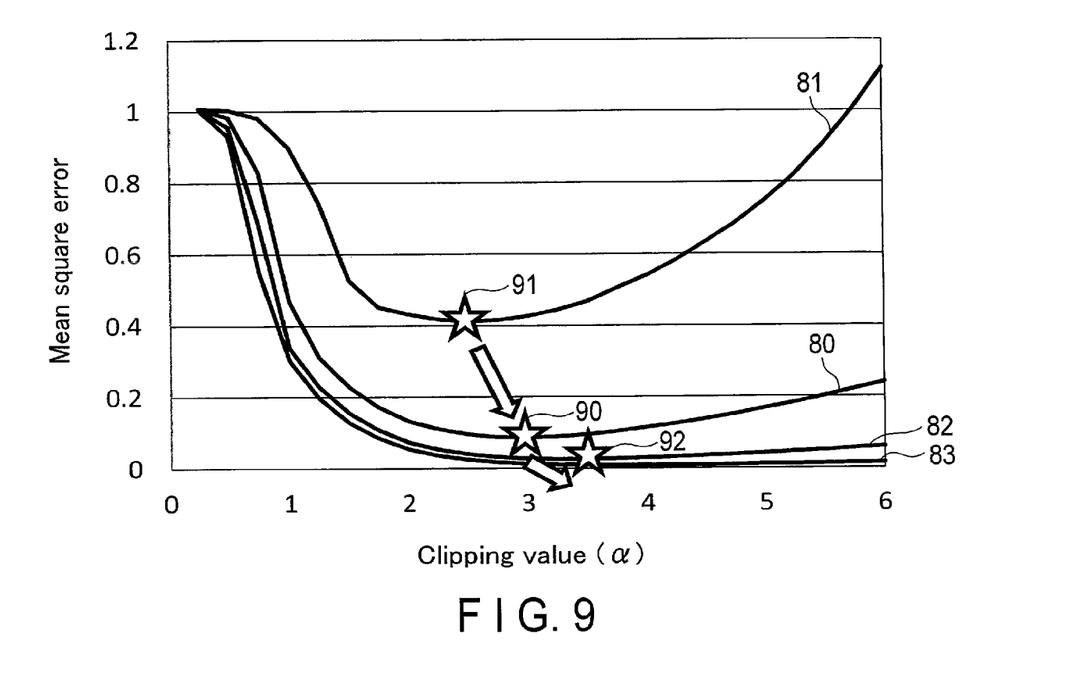
FIG. 9 is a diagram for explaining processing of determining a quantization conditions in a modification of the first embodiment.

FIG. 9 is a diagram for explaining a modification of the first embodiment. According to this modification as shown in FIG. 9, the quantization bit number M is set stepwise to, for example, 2 bits, 3 bits, 4 bits, 5 bits, and so on, and the optimum values of the quantization width Δ and the quantization range are determined in the manner as discussed above.

More concretely, the quantization bit number M is first set to, for example, 2 bits, whereby the mean square error is plotted as a gradient difference (output result 81). Based on the output result 81, the learning unit 12 determines the minimum mean square error point 91 to be the optimum clipping value α, and adopt it for the optimum quantization conditions. The learning unit 12 then determines whether or not the target accuracy is kept attained by repeating the learning process based on these quantization conditions and confirming the learning accuracy.

If it is determined that the target accuracy is not presently secured, the learning unit 12 sets the quantization bit number M to, for example, 3 bits, and plots the mean square error as a gradient difference (output result 80). Based on the output result 80, the learning unit 12 determines the minimum mean square error point 90 to be the optimum clipping value α, and adopt it for the optimum quantization conditions.

The learning unit 12 then similarly determines whether or not the target accuracy is kept attained by repeating the learning process based on these quantization conditions and confirming the learning accuracy. If it is determined that the target accuracy is still not secured, the learning unit 12 sets the quantization bit number M to, for example, 4 bits, and plots the mean square error as a gradient difference (output result 82). Based on the output result 82, the learning unit 12 determines the minimum mean square error point 92 to be the optimum clipping value α, and adopt it for the optimum quantization conditions. Subsequently, the quantization bit number may further be set to 5 bits to obtain an output result 83. In this manner, the learning unit 12 according to the modification proceeds with the processing of determining the optimum values of the quantization width Δ and the quantization range as the optimum quantization conditions, and terminates the processing once the target accuracy is secured.

Figure 10:
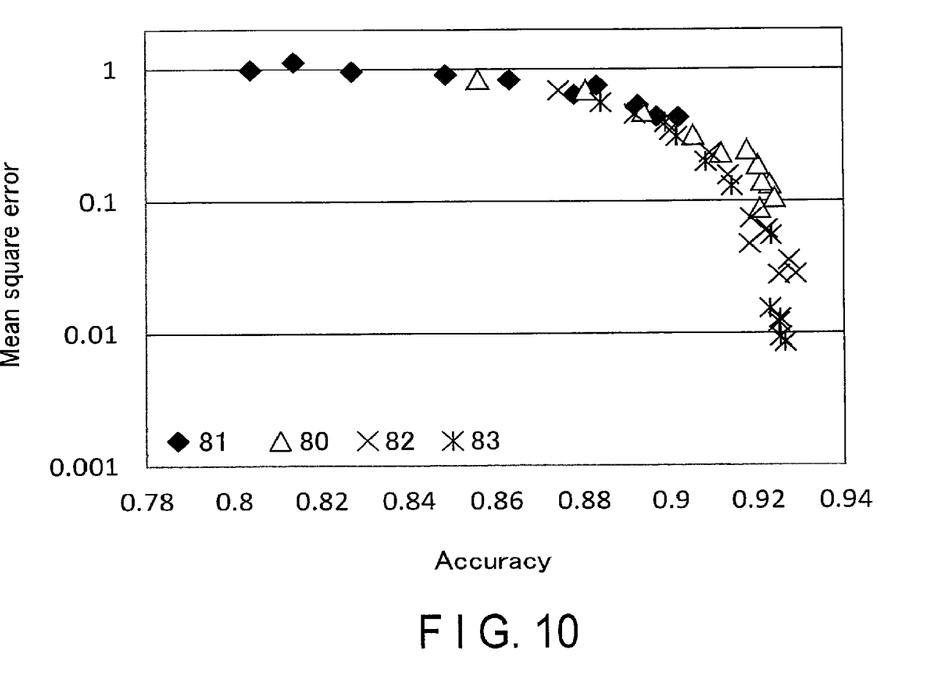
FIG. 10 is a diagram for explaining one example of an effect of the first embodiment.

According to the first embodiment and its modification as described, the optimum values of the quantization width and the quantization range as the optimum quantization conditions are determined based on the mean square error as a difference between the gradients calculated using the activations before and after quantization. Therefore, the first embodiment and the modification can save a memory capacity by quantization, while at the same time securing sufficient learning accuracy in the learning process. FIG. 10 is a diagram showing the effect of the first embodiment and the modification in an actual learning process. When the first embodiment or the modification is applied to an actual learning process using, for example, CIFAR10, a correlation tendency is confirmed between the mean square error of each of the functions 80 to 83 for the quantization bit number M, and the learning accuracy. Here, as described above, the gradient (dW) is calculated based on the quantized activation directly involved in the update of the parameter (W). As such, it can be assumed that the difference (mean square error) in gradient (dW) has a correlation tendency with the learning accuracy.

Second Embodiment

Figure 11:
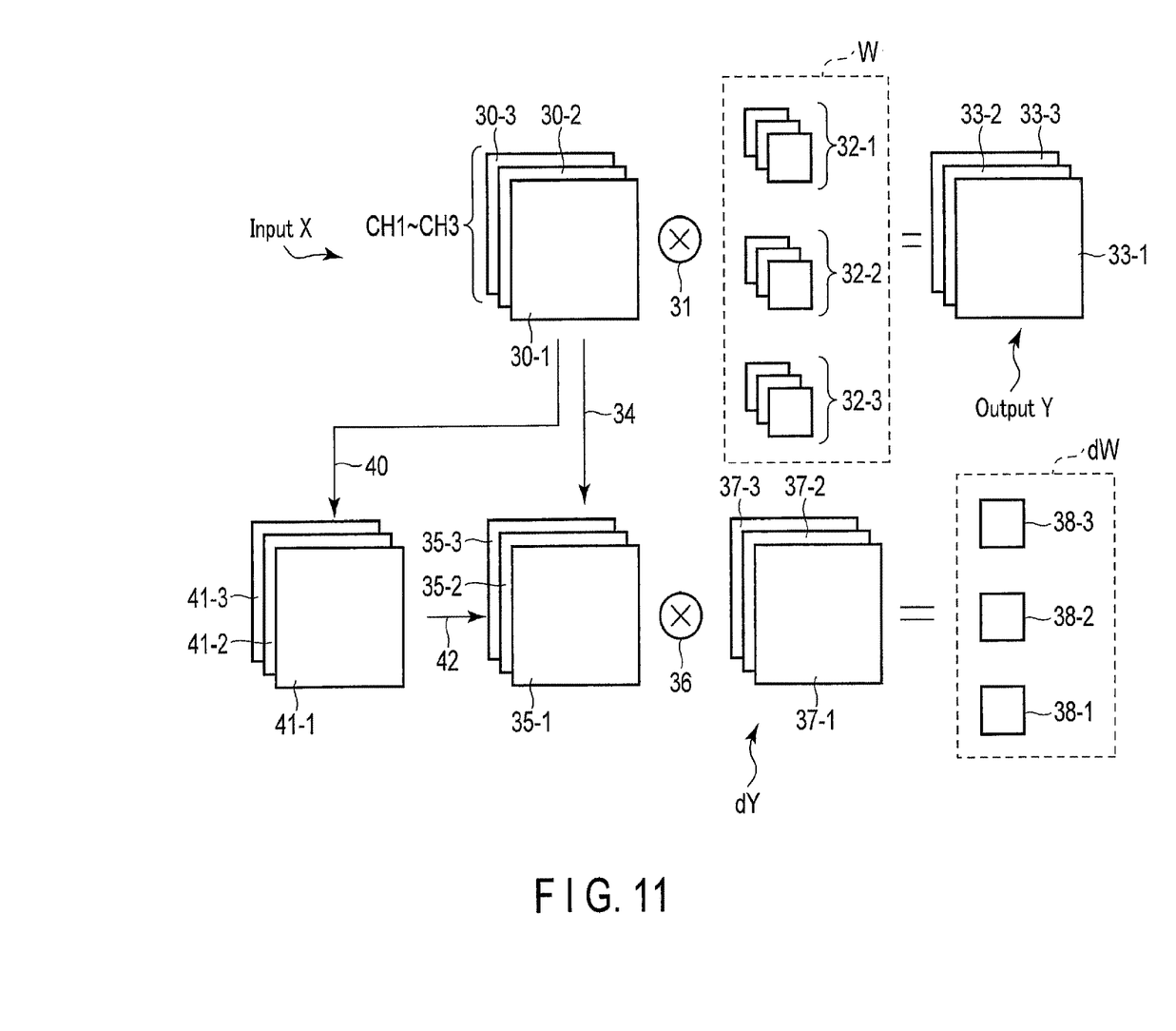
FIG. 11 is a diagram for explaining an overview of quantization and encoding in a second embodiment.

For the second embodiment, FIG. 11 is set forth for explaining an overview of the convolution in the learning process of the CNN 20 as well as an overview of the quantization. An information processing apparatus for the second embodiment may adopt the same configuration as the information processing apparatus according to the first embodiment described above (cf. FIGS. 1 and 2).

In also this second embodiment, the CNN 20 performs the convolution (31) with a parameter (weight W) according to the weight filter 32 and propagates the convolution result to the non-illustrated output layer (forward propagation), as in the first embodiment. The output layer calculates an error (dY) between the output Y and a ground truth label. If the error (dY) is found between the output Y and the ground truth label, the CNN 20 calculates the gradient (dw) for updating the parameter (W) by back propagation (BP processing).

According to the second embodiment, the learning unit 12 performs the quantization (34) to quantize the activation 30 represented by, for example, 32 bits, and also performs encoding (40) to encode (compress) the activation 30 so that the resultant activation will be used for the BP processing in the CNN 20. The learning unit 12 stores the quantized, and then encoded activation, i.e., a quantized activation 41 (representative of quantized activations 41-1 to 41-3), in the memory 11.

More specifically, the learning unit 12 performs the quantization (34) before the encoding (40), to quantize the activation 30 represented by, for example, 32 bits into the quantized activation 35 represented by, for example, 4 bits. After the quantization (34), the learning unit 12 further performs the encoding (40) to encode the quantized activation 35 by, for example, Huffman coding, and stores resultant activation in the memory 11 as the quantized activation 41.

Then, at the BP processing according to the second embodiment, the learning unit 12 acquires the quantized activation 41 stored in the memory 11, and performs decoding (42) to decode it into the quantized activation 35 represented by, for example, 4 bits. The learning unit 12 performs the convolution (36) using the quantized activation 35 after the decoding and the back-propagated error (dY), to calculate the gradient (dW) for updating the parameter (W). The subsequent processing proceeds in a similar manner to the first embodiment described above (cf. steps S9 and S10 in FIG. 7), so overlapping explanation will be omitted.

According to the second embodiment, for the non-quantized activation 30 to be subjected to the bit-number reduction and stored in the memory 11, the activation 30 undergoes the quantization and also the encoding (compression). Therefore, as compared to the case of simply performing the quantization, the second embodiment can further reduce the average bit number. Generally, activations before quantization, i.e., the activations 30, show a normal distribution in which the center bit frequency tends to be large. Due to this, the case of simply performing the quantization would not endow allotting the quantized activations 35 to the normal distribution with a good bit efficiency, and may not promise effective reduction of the average bit number.

Figure 12:
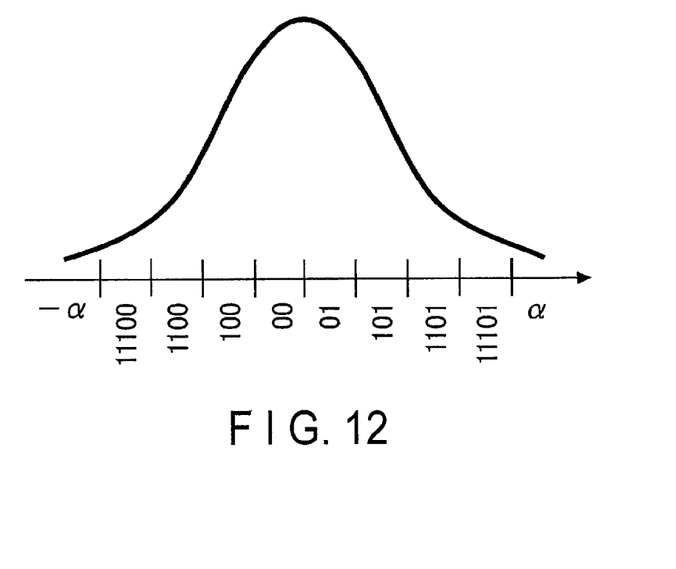
FIG. 12 is a diagram for explaining exemplary quantization and encoding in the second embodiment.

FIG. 12 shows an exemplary code set when a normal distribution of the activations 30 is clipped (limited) by the value α for the quantization range, the quantization and the encoding are performed, and the thus-obtained, for example, Huffman codes are allotted to the normal distribution. In the second embodiment, the learning unit 12 uses, for example, a lookup table so that, in the encoding/decoding operation, it can refer to the codes to allot to the normal distribution. According to the second embodiment, therefore, performing the quantization and the encoding (compression) can improve the bit efficiency in the allotment to the normal distribution, and consequently allow for the effective reduction of the average bit number.

As appreciated from the foregoing description, the first and the second embodiments including their modifications provide an information processing method and an information processing apparatus that can realize optimum quantization of activations in CNNs.

While certain embodiments have been described, they have been presented by way of example only, and they are not intended to limit the scope of the inventions. Indeed, the novel embodiments described herein may be worked in a variety of other forms. Furthermore, various omissions, substitutions, and changes in the form of the embodiments may be made without departing from the spirit of the inventions. The embodiments and their modifications are covered by the accompanying claims and their equivalents, as would fall within the scope and gist of the inventions.

What is claimed is:

1. An information processing method for a learning process of a deep neural network comprising a convolution layer, the method using a processor and a memory, the learning process including forward propagation and back propagation, the method comprising:
performing, in an intermediate layer of the deep neural network, the forward propagation using a first parameter and based on a first input value represented by a first bit number;
performing quantization to produce a second input value represented by a second bit number smaller than the first bit number, and storing the produced second input value in the memory;
calculating a second parameter based on a result of an operation using the second input value stored in the memory and a value obtained by the forward propagation, the second parameter being an update of the first parameter and for use in the learning process; and
determining a condition for the quantization based on a gradient difference obtained in said calculating the second parameter.

2. The method according to claim 1, wherein said calculating the second parameter comprises
calculating a gradient using the second input value and an output error of the forward propagation, and
calculating the second parameter based on the calculated gradient.

3. The method according to claim 1, wherein the condition for the quantization comprises a quantization range and a quantization width, the quantization range comprising a lower limit and an upper limit of a subject of the quantization, the quantization width corresponding to a quantization step according to the second bit number in the quantization range.

4. The method according to claim 3, wherein said determining the condition for the quantization comprises
outputting the gradient difference based on the second bit number as a function of the quantization range, and
determining an optimum value of the quantization range based on a minimum point of the function.

5. The method according to claim 4, wherein the gradient difference is a mean square error of a gradient corresponding to an update amount for calculating the second parameter, and
wherein said determining the condition for the quantization comprises
outputting the mean square error as a function of the quantization range, with the second bit number set to a predetermined value, and
determining the optimum value of the quantization range based on a minimum value of the mean square error.

6. The method according to claim 5, wherein said determining the condition for the quantization comprises
iterating the learning process using the second parameter until a predetermined timing, and outputting afresh the mean square error as the function of the quantization range, and
determining afresh the optimum value of the quantization range based on the minimum value of the mean square error.

7. The method according to claim 4, wherein said determining the condition for the quantization comprises
setting the second bit number to different values in a stepwise manner, and outputting the mean square error as a function of the quantization range for each of the set values of the second bit number, and
determining the optimum value of the quantization range based on the minimum point of the function for each of the set values of the second bit number and based on a predetermined learning accuracy.

8. The method according to claim 1, wherein said storing the second input value in the memory comprises storing a third input value in the memory as the second input value, the third input value obtainable by encoding the second input value obtained by the quantization, and
wherein said calculating the second parameter comprises
decoding the third input value stored in the memory and calculating, as the second parameter, a third parameter based on a result of an operation using the decoded third input value, the second parameter being an update of the first parameter and for use in the learning process.

9. An information processing apparatus comprising:
a processor configured to conduct a learning process of a deep neural network comprising a convolution layer, the learning process including forward propagation and back propagation; and
a memory configured to use by the processor,
wherein the processor is configured to
perform, in an intermediate layer of the deep neural network, the forward propagation using a first parameter and based on a first input value represented by a first bit number,
perform quantization to produce a second input value represented by a second bit number smaller than the first bit number, and storing the second input value in the memory,
calculate a second parameter based on a result of an operation using the second input value stored in the memory and a value obtained by the forward propagation, the second parameter being an update of the first parameter and for use in the learning process, and
determine a condition for the quantization based on a gradient difference obtained in said calculating the second parameter.

10. The apparatus according to claim 9, wherein the processor is further configured to
calculate a gradient using the second input value and an output error of the forward propagation, and
calculate the second parameter based on the calculated gradient.

11. The apparatus according to claim 9, wherein the condition for the quantization comprises a quantization range and a quantization width, the quantization range comprising a lower limit and an upper limit of a subject of the quantization, the quantization width corresponding to a quantization step according to the second bit number in the quantization range.

12. The apparatus according to claim 11, wherein the processor is further configured to
output the gradient difference based on the second bit number as a function of the quantization range, and
determine an optimum value of the quantization range based on a minimum point of the function.

13. The apparatus according to claim 12, wherein the gradient difference is a mean square error of a gradient corresponding to an update amount for calculating the second parameter, and wherein the processor is further configured to
output the mean square error as a function of the quantization range, with the second bit number set to a predetermined value, and
determine the optimum value of the quantization range based on a minimum value of the mean square error.

14. The apparatus according to claim 13, wherein the processor is further configured to
iterate the learning process using the second parameter until a predetermined timing, and outputting afresh the mean square error as the function of the quantization range, and
determine afresh the optimum value of the quantization range based on the minimum value of the mean square error.

15. The apparatus according to claim 12, wherein the processor is further configured to
set the second bit number to different values in a stepwise manner, and output the mean square error as a function of the quantization range for each of the set values of the second bit number, and
determine the optimum value of the quantization range based on the minimum point of the function for each of the set values of the second bit number and based on a predetermined learning accuracy.

16. The apparatus according to claim 9, wherein the processor is further configured to store a third input value in the memory as the second input value, the third input value obtainable by encoding the second input value obtained by the quantization, and
wherein, the processor is further configured to decode the third input value stored in the memory and to calculate, as the second parameter, a third parameter based on a result of an operation using the decoded third input value, the second parameter being an update of the first parameter and for use in the learning process.

\* \* \* \* \*